United States Patent [19]

Rosenbaum

[11] Patent Number: 5,056,647
[45] Date of Patent: Oct. 15, 1991

[54] HIGH-SPEED CONVEYOR BAGGAGE HANDLING SYSTEM

[75] Inventor: Werner Rosenbaum, New York, N.Y.

[73] Assignee: London & Egazarian Associates, Inc., Rye Brook, N.Y.

[21] Appl. No.: 509,971

[22] Filed: Apr. 16, 1990

[51] Int. Cl.$^5$ .............................................. B65G 37/00
[52] U.S. Cl. ..................... 198/460; 198/579; 198/461; 198/464.4; 198/573; 198/813
[58] Field of Search ............ 198/460, 461, 462, 464.2, 198/464.4, 572, 573, 579, 813, 860.4, 435; 244/137.1

[56] References Cited

U.S. PATENT DOCUMENTS

| | | | |
|---|---|---|---|
| 2,804,192 | 8/1957 | Armstrong et al. | 198/435 X |
| 3,485,339 | 12/1969 | Miller et al. | 198/579 X |
| 3,923,151 | 12/1975 | Weber | 198/813 X |
| 4,093,066 | 6/1978 | Mitchell et al. | 198/860.4 X |
| 4,227,607 | 10/1980 | Malavenda | 198/460 |
| 4,653,630 | 3/1987 | Bravin | 198/460 |
| 4,747,817 | 5/1988 | Newsome | 198/461 X |

OTHER PUBLICATIONS

MergeVeyor Brochure, JanTec, Inc.
Automatic Reading System for Baggage Sortation, Mannesmann Demag Fordertechnik, 4/88.
Standard Technical Specifications for Baggage Handling Systems, Eastern Airlines, Inc., Feb. 4, 1983.
New Generation Belt Power Turns, Portec, Flomaster Div., 9/89.
Transnorm System Ltd., Letter of 8/88 re Belt Power Turns.

Primary Examiner—D. Glenn Dayoan
Assistant Examiner—Tuan N. Nguyen
Attorney, Agent, or Firm—Leo Zucker

[57] ABSTRACT

A high-speed conveyor system for conveying articles of baggage, includes a number of accelerating conveyor belt sections arranged in tandem for transporting a number of baggage articles loaded onto an upstream end of a first one of the belt sections to a downstream end of a last one of the belt sections. The sections are driven at successively increasing rates of speed from the first to the last one. High-speed conveyor belt sections transport baggage articles received from the last one of the accelerating conveyor belt sections at a substantially high rate of speed over a relatively long distance to a downstream end of the high-speed sections. A number of decelerating conveyor belt sections are arranged in tandem for transporting baggage articles fed from the high-speed conveyor belt sections onto an upstream end of a first one of the decelerating conveyor belt sections. The baggage articles are conveyed to a downstream end of a last one of the decelerating conveyor belt section at successively decreasing rates of speed from the first to the last one of the belt sections.

31 Claims, 7 Drawing Sheets

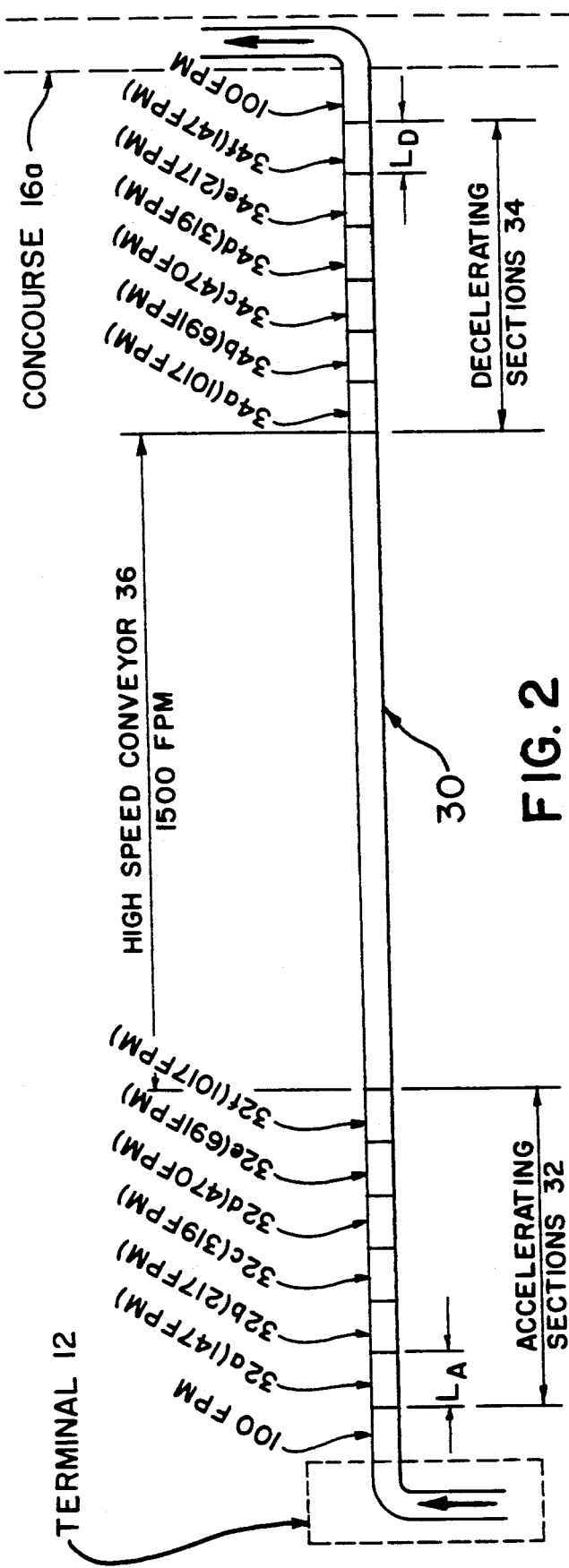
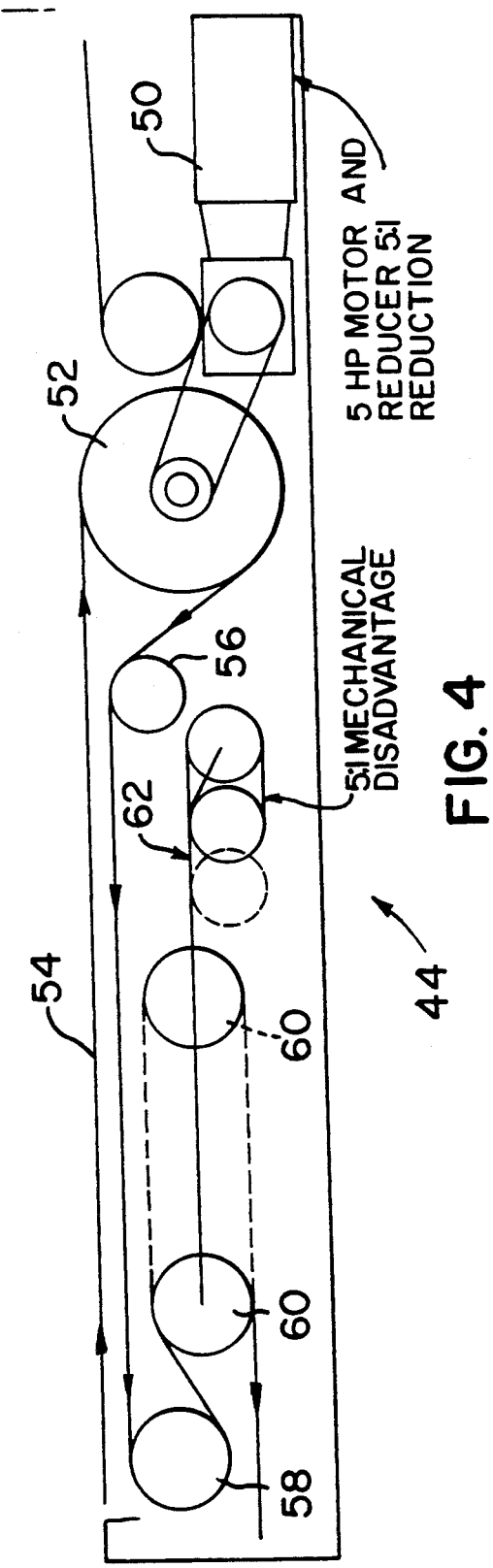
FIG. 2
FIG. 4

*MIRRORS No. 2 & 3 SHOWN STAGGERED FOR CLARITY.
MIRRORS ACTUALLY ARE IN SAME PLANE.

HIGH-SPEED CONVEYOR BAGGAGE HANDLING SYSTEM

BACKGROUND OF THE INVENTION

1. Field of the Invention

The present invention relates generally to airport baggage handling systems, and more particularly to a high-speed conveyor baggage handling system capable of transporting luggage quickly and efficiently between an airport terminal and a number of aircraft loading/unloading concourse areas located far away from the terminal.

2. Description of the Known Art

Enormous burdens are placed on ground personnel at passenger airport facilities, with respect to the proper routing of luggage between curb-side and terminal baggage loading areas, and various departing aircraft onto which the luggage must be timely and properly loaded. Likewise, baggage articles unloaded from arriving aircraft must be correctly routed to an arriving passenger area in the airport terminal which usually includes one or more incoming baggage carrousels.

Various techniques exist for the routing of baggage between a main airport terminal and numerous arriving and departing aircraft. Such techniques include:

(1) Modular luggage containers and tandem luggage carts to facilitate ground transport of baggage by motor truck between the airport terminal and various aircraft on the ground far from the terminal; and (2) A so-called pier sorting arrangement in which bar code labels placed on the baggage are scanned by laser scanners, and individual baggage pieces are tracked and diverted onto conveyor belts leading to assigned "piers" from which the pieces are trucked out to the proper aircraft.

As far as is known, no airport baggage handling system provides for transport of luggage entirely by way of conveyor belt between remote concourse areas at which aircraft are loaded and unloaded, and a main terminal area at which both departing and incoming luggage must be deposited.

Until now, conveyor belts for handling of baggage are not believed to operate at rates greater than about 500 ft. per minute. This speed limitation has been imposed by mechanical restraints as well as for purposes of safety. Further, it may not always be possible to restrict ground traffic at an airport by the presence of a long, above-ground conveyor belt run between the main terminal and the various aircraft gates or concourses.

Another potential problem with an all-conveyor belt baggage handling system resides in the detection of faults, i.e., interruptions of conveyor belt motion and/or piling-up of baggage at a point along the conveyor path, the occurrence of which would not be made known immediately to ground maintenance personnel.

Another known baggage handling system, referred to as the Destination Coded Vehicle (DCV) system, calls for the use of fast-moving luggage carts on fixed rails extending over long distances.

SUMMARY OF THE INVENTION

An object of the invention is to overcome the above and other disadvantages of the known airport baggage handling systems.

Another object of the invention is to provide a high-speed airport baggage handling system that is compatible with existing pier-sort airport baggage installations.

A further object of the invention is to provide an airport baggage handling system capable of transporting articles of luggage over long distances between a main terminal and a number of aircraft concourse areas and with minimal maintenance requirements.

Another object of the invention is to provide a conveyor belt type of baggage handling system including a high-speed conveyor run for transporting luggage over long distances in a minimal amount of time.

A further object of the invention is to provide a conveyor belt type of baggage handling system capable of transporting luggage articles at high speeds while at the same time monitoring for the occurrence of a fault and automatically disabling the system until the fault is corrected.

Yet another object of the invention is to provide a high-speed conveyor belt type of baggage system in which considerably long stretches of the conveyor system operating at high speed are maintained beneath ground level in tunnels which are readily accessible from the ground, thereby leaving the ground above free for movement of aircraft and other operating vehicles.

According to one aspect of the invention, a high-speed conveyor system includes accelerating conveyor means for receiving baggage articles, including a number of accelerating conveyor belt sections arranged in tandem for transporting baggage articles loaded at an upstream end of a first one of the accelerating conveyor belt sections, to a downstream end of a last one of the accelerating conveyor belt sections. Accelerating drive means drives the accelerating conveyor belt sections at successively increasing rates of speed.

High-speed conveyor means receives baggage articles from the downstream end of the last one of the accelerating conveyor belt sections, and includes at least one conveyor belt section for transporting received baggage articles at a relatively high rate of speed to a downstream end of the high speed conveyor means.

Decelerating conveyor means receives baggage articles from the downstream end of the high speed conveyor means, and includes a number of decelerating conveyor belt sections arranged in tandem for transporting the baggage articles from an upstream end of a first one of the decelerating conveyor belt sections to a downstream end of a last one of a the belt sections. Decelerating drive means drives the decelerating conveyor belt sections at successively decreasing rates of speed from the first to the last one of the belt sections.

For a better understanding of the present invention, together with other and further objects, reference is made to the following description taken in conjunction with the accompanying drawing figures, and the scope of the invention will be pointed out in the appended claims.

BRIEF DESCRIPTION OF THE DRAWING

In the drawing:

FIG. 2 is a schematic representation of a high speed conveyor system according to the invention;

FIG. 4 is a side view in schematic form, depicting a horizontal take-up and drive arrangement for a high-speed conveyor belt section according to the invention;

DETAILED DESCRIPTION OF THE INVENTION

Figure 1:
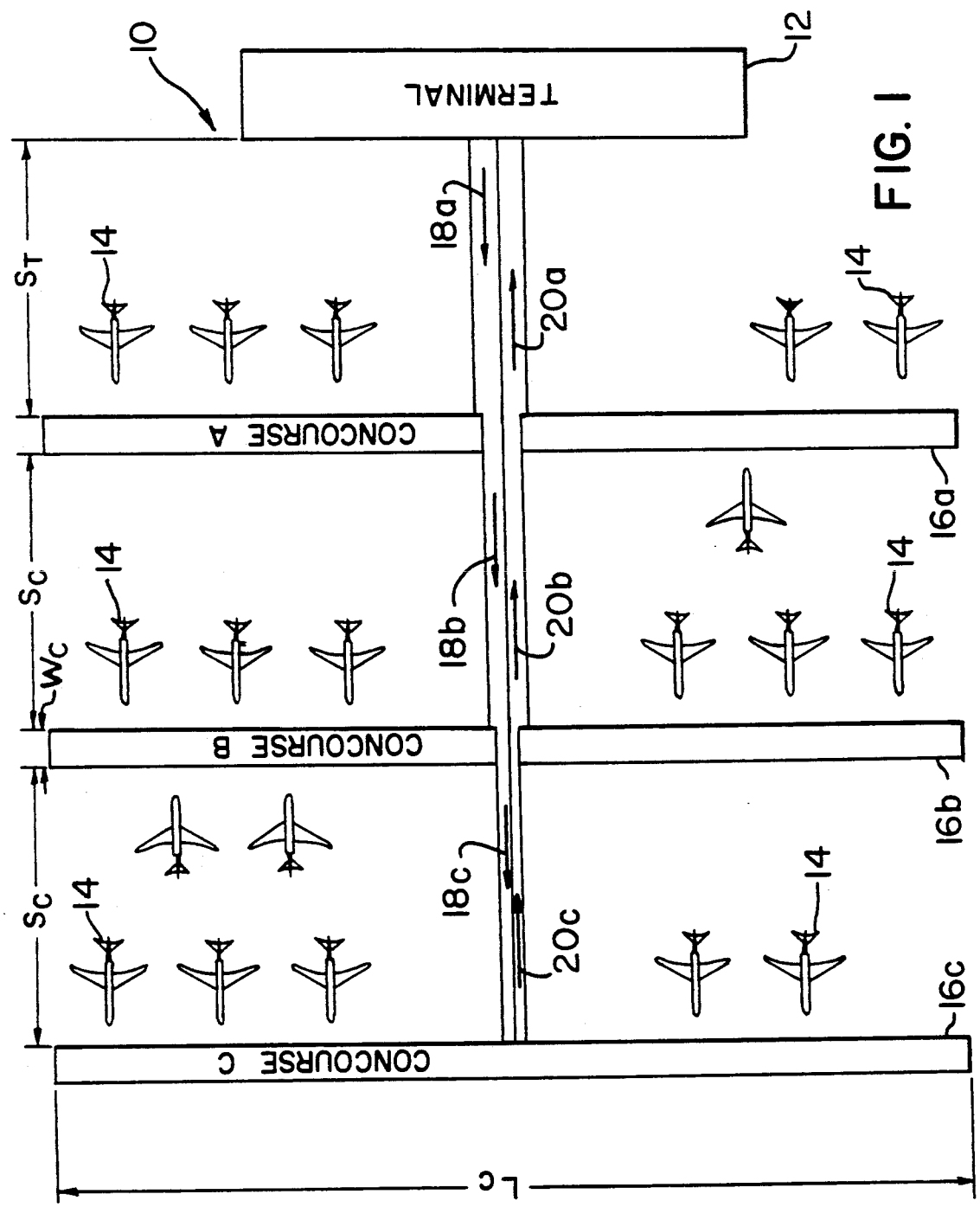
FIG. 1 is a plan view of an airport showing a main terminal and aircraft concourses interconnected by a conveyor baggage handling system according to the invention.
Figure 1:
Figure 1:

FIG. 1 is a plan view of a typical airport 10 provided with a high-speed conveyor baggage handling system according to the invention.

A main terminal 12 allows passengers to check in items of luggage and baggage to be loaded on one of a number of aircraft 14 situated at several concourses 16a, 16b and 16c. Terminal 12 is linked with the concourses by way of outbound conveyor systems 18a, 18b and 18c, and inbound conveyor systems 20a, 20b and 20c.

The terms "baggage" and "luggage" as used herein are intended to apply to any article, box, suitcase, parcel or any other item of such size and weight suitable for transport by conveyor.

Each of the concourses has a typical length $L_C$ of about 4000 feet. The spacing $S_C$ between concourses, and the distance $S_T$ between concourse 16a and the main terminal 12, is about 1200 feet. Also, each concourse has a width $W_C$ of about 160 feet.

FIG. 2 shows a baggage conveyor system 30 according to the invention. Each of the outbound conveyor systems 18a, 18b 18c and the inbound conveyor systems 20a, 20b, 20c is comprised of at least one of the conveyor systems 30 such as shown in FIG. 2. For example, the outbound conveyor system 18a, and the inbound conveyor system 20a may each be comprised of nine of the conveyor systems 30. Outbound systems 18b and inbound systems 20b may each include a lesser number, e.g., six of the conveyor systems 30. Outbound conveyor system 18c and inbound conveyor system 20c each may include an even lesser number, e.g., three of the conveyor systems 30.

Each conveyor system 30 is, as shown in FIG. 2, comprised of a number of tandem accelerating conveyor belt sections 32a-f, and a number of tandem decelerating conveyor belt sections 34a-f. A high speed conveyor 36 is arranged between the downstream end of a last one 32f of the accelerating sections, and an upstream end of a first one 34a of the decelerating sections 34. Each of the accelerating conveyor belt sections 32 and the decelerating conveyor belt sections 34 has a typical length $L_A$, $L_D$ of about 10 feet. The high speed conveyor 36 therefore extends over a distance of typically 1000 or more feet between the main terminal 12 and the first concourse 16a, as well as between the concourses 16a and 16b, and the concourses 16b and 16c. Conventional luggage conveyors at the main terminal 12 (see FIG. 8) operate to feed outbound luggage, and to receive inbound luggage, at a rate of about 100 feet per minute. Likewise, conveyor belts operating at the concourses 16a-16c to provide means for feeding unloaded baggage to one of the inbound conveyor systems 20a-20c may also operate at about the 100 foot per minute rate. As mentioned earlier, the incoming and outgoing luggage must be transported between the distant concourses and the terminal 12 at much greater speeds so as to avoid lengthy delays in the entire luggage loading and unloading process.

The high speed conveyor 36 therefore operates at a substantially higher rate of speed than the terminal or concourse conveyor belts, for example, at a rate between 500 to about 1500 feet per minute so as to minimize as much as possible the time needed for baggage loading/unloading for each of the aircraft 14 while stationed at the concourses 16a-16c.

Conventional drive means associated with each of the accelerating conveyor belt sections 32a-f operates to drive the sections at successively increasing rates of speed. Baggage articles received at the upstream end of the first section 32a thus are accelerated stepwise from the 100 ft. per minute rate to a rate of, e.g., 1017 feet per minute on the last conveyor belt section 32f. Baggage delivered to the downstream end of the last accelerating section 32f is then received at the upstream end of the high speed conveyor 36 for transport at a rate of, e.g., 1500 feet per minute over almost the entire distance between the terminal 12 and first concourse 16a, or between adjacent ones of the concourses 16a-c.

The decelerating conveyor belt sections 34a-f are arranged and operate similarly to the accelerating sections 32a-f, but at successively decreasing rates of speed. That is, conventional drive means associated with the decelerating conveyor belt sections 34a-f drives the sections at successively decreasing rates of speed from, e.g., 1017 feet per minute to, e.g., 147 feet per minute. Luggage delivered to the downstream end of the last one 34f of the decelerating conveyor belt sections may then be received by a conventional moving luggage belt operating at about the 100 feet per minute rate.

As depicted in FIG. 2, accelerating conveyor belt sections 32b-e intermediate the first 32a and the last 32f of the sections 32 may operate at, for example, rates of 217, 319, 470 and 691 feet per minute, respectively. Successive ones of decelerating conveyor belt sections 34b-e, intermediate the first 34a and the last 34f of the sections 34 operate at, for example, 691, 470, 319, and 217 feet per minute, respectively.

Further, high speed conveyor 36 is preferably comprised of a number of high speed belt sections in tandem, each about 200 feet in length, as described in connection with FIGS. 4-6 below.

Figure 3:
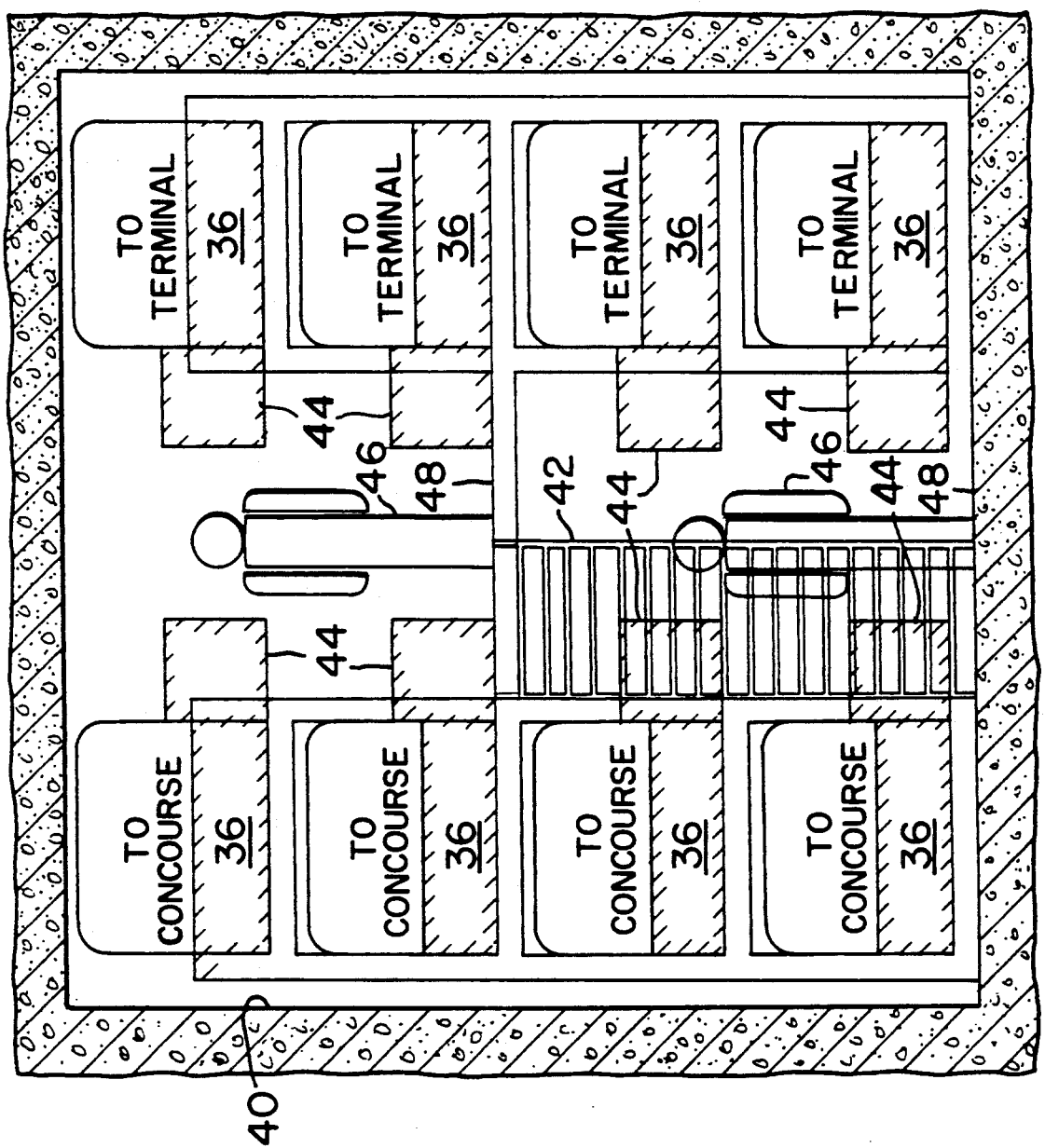
FIG. 3 is a sectional view showing a number of the present conveyor systems arranged in a tunnel below grade.

FIG. 3 is a cross-section of a tunnel 40, formed beneath grade of the airport 10 in FIG. 1 to contain a number of the high speed conveyors 36. Each tunnel 40 permits access to the high speed conveyors 36 by way of, for example, removable ground plates (not shown), stairs and ladders 42. Accordingly, a number of tunnels 40 may extend parallel to one another beneath grade between the main terminal 12 and the concourses 16a-c so as to allow for ground operations above the high speed conveyors 36 while at the same time insuring safety of the ground personnel by keeping all fast-moving luggage articles within the confines of the tunnels 40. In order to accommodate, e.g., eight of the high speed conveyors 36 in the configuration shown in FIG. 3, a tunnel cross-section of about 18 feet high by 18 feet, 4 inches wide would enable sufficient space for the conveyors 36 and associated drive mechanisms 44 (see FIG. 4), the latter preferably being a horizontal take-up drive arrangement.

Inasmuch as the high speed conveyor drive mechanisms 44 protrude sideways from the lengths of the conveyor support frames, as shown in FIG. 3, it is preferred that the drive mechanisms 44 of oppositely facing conveyors 36 be mutually staggered with respect to one another along the direction of the conveyors 36, so as to permit easy movement by maintenance personnel 46 along service aisles 48 between parallel conveyors 36.

FIG. 4 depicts one of the horizontal take-up drive mechanisms 44. As mentioned in connection with FIG. 3, the mechanism 44 projects sideways from the main frame of the high speed conveyor 36 in a suitable enclosure which is preferably limited in height to about 18 inches and in projected distance to about 2 feet. The length of the drive mechanism along the direction of the conveyor frame is preferably limited to about 10 feet.

Each high speed conveyor 36 is comprised of a number of, for example, 200 foot sections arranged in tandem, wherein each 200 foot section has an associated horizontal take-up drive mechanism 44 (FIG. 4).

It is contemplated that the drive mechanism 44 for each 200 foot high-speed section can be powered by a 5-HP motor and reducer assembly 50. The motor/reducer assembly 50 is belt-coupled to a drive roller 52 about which high speed conveyor belt 54 is wrapped. Belt 54 then passes over idler rollers 56, 58 and a slack take-up roller 60. Take-up roller 60 provides for about 24 inches of available take-up movement in a horizontal direction, and is urged in the take-up direction by a conventional mechanical disadvantage cable and pulley arrangement 62. A biasing weight such as a lead block (not shown) is contained within the enclosure of the drive mechanism 44 so as to provide the necessary biasing force through the mechanical disadvantage arrangement 62, to the take-up roller 60 in the horizontal direction.

Figure 5:
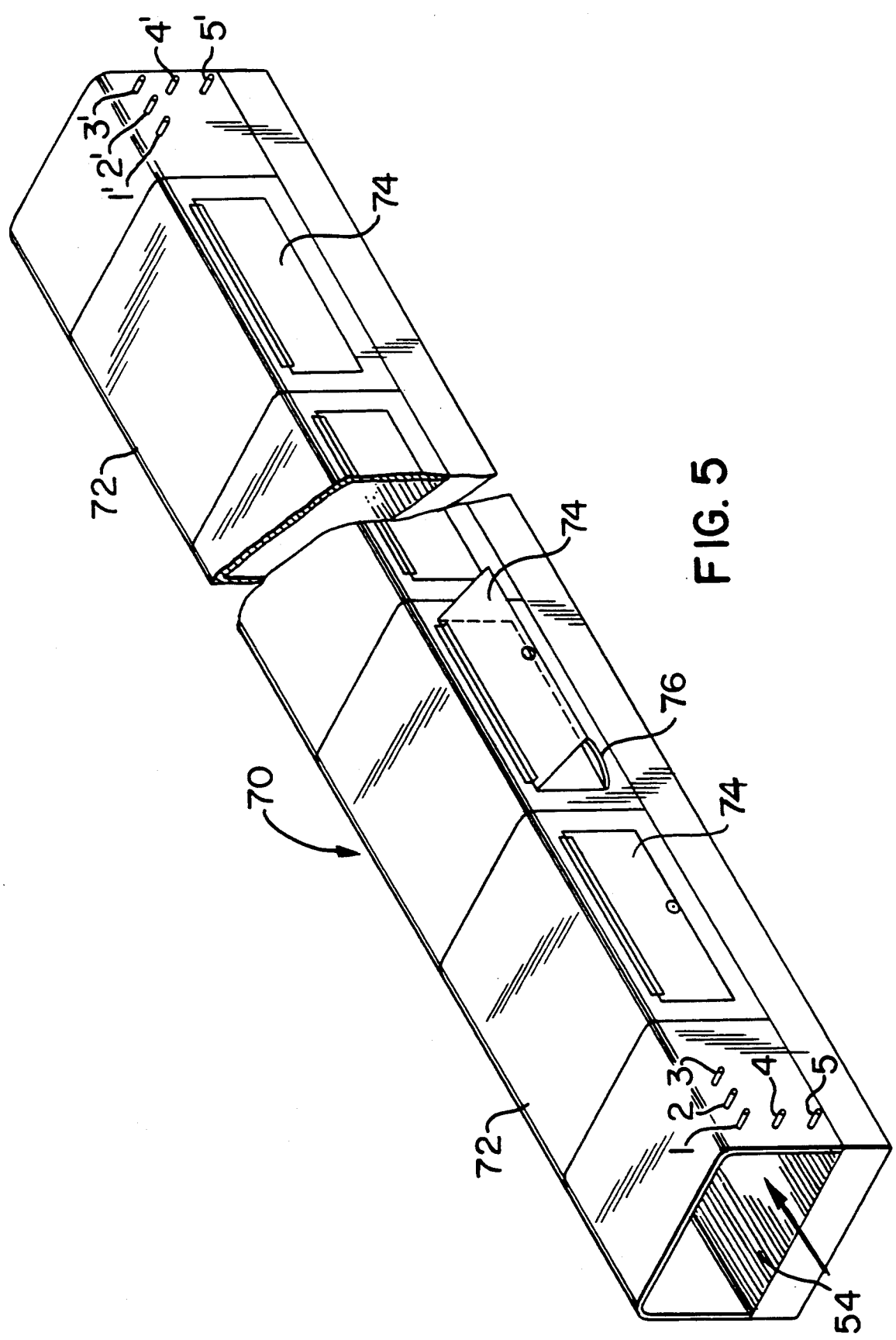
FIG. 5 is a perspective view of a high-speed conveyor section, including protective covers and a light beam type of fault detecting system.

FIG. 5 is a perspective view of one 200-foot high speed conveyor section 70.

In order to ensure safety of maintenance personnel, as well as to confine any inadvertent baggage pile-ups on the high speed belt 54 within a limited area, each of the high speed conveyor sections 70 is covered by a series of, for example, 10-foot long protective shrouds 72. Each shroud 72 has an associated hinged plexiglass window 74 which, when swung to an open position, can be fixed thereat by a suitable rod-like device 76 as shown in FIG. 5.

Figure 6:
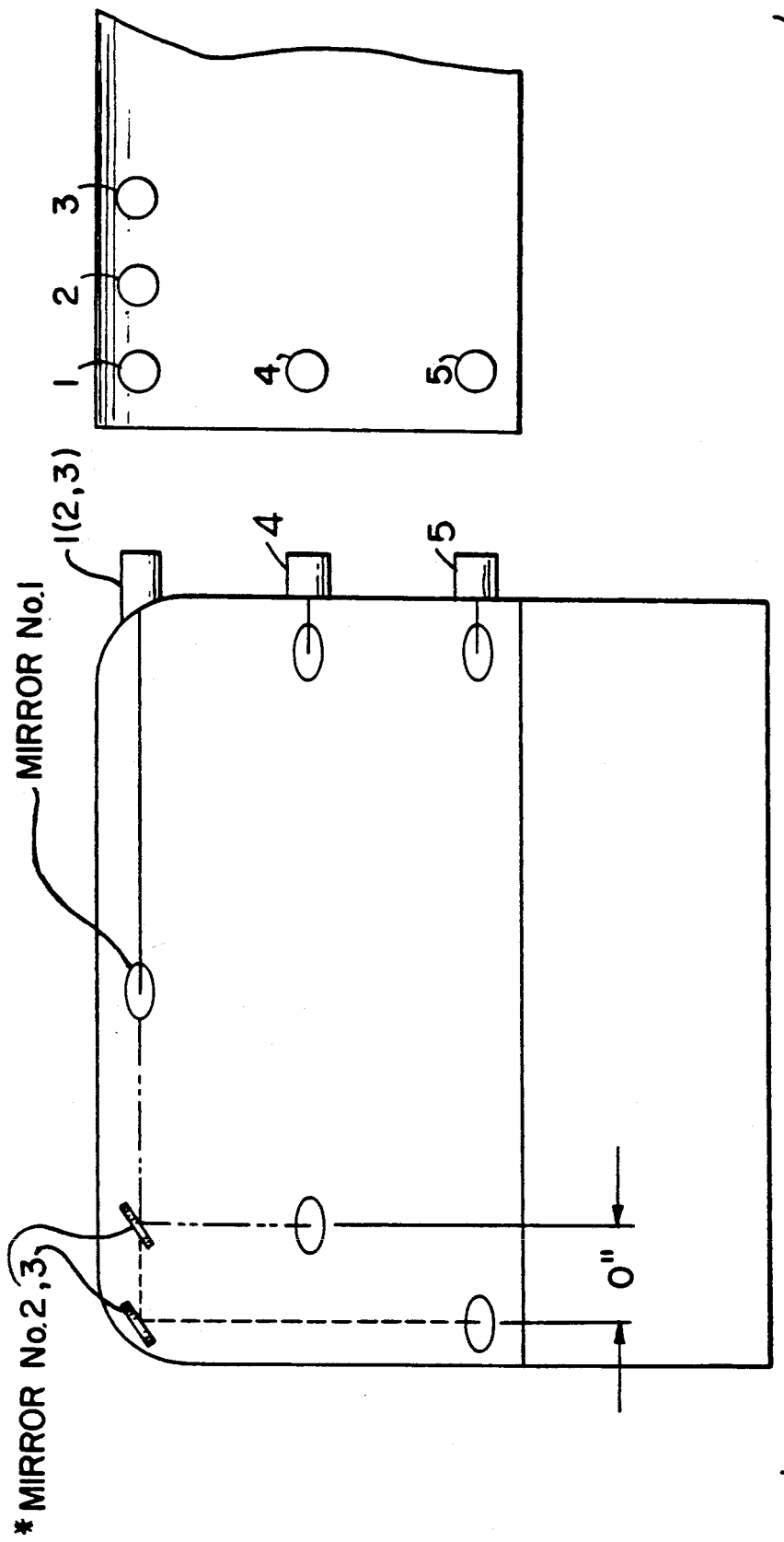
FIG. 6 is an enlarged end view of the high-speed conveyor section of FIG. 5, depicting an arrangement of light beam transmitters and deflecting mirrors that form the fault detecting system.

FIGS. 5 and 6 also show details of a light beam type of fault detection system, including a number of laser transmitters 1 to 5 arranged at the side of the upstream end of the conveyor section 70, and a number of laser receivers 1' to 5' arranged on the same side of the section 70 at its downstream end.

A number of 45-degree deflecting mirrors are arranged about the periphery of the upstream end of the conveyor section 70, for deflecting laser beams originating from the transmitters 1-5 in a direction parallel to the axis of the belt 54 close to the inner periphery of the shroud 72. A series of corresponding mirrors at the downstream end of the conveyor section 70 deflect the beams received from the upstream end to corresponding ones of the laser receivers 1' to 5'.

Accordingly, if a piece of baggage should strike the inner periphery of the conveyor enclosure shrouds 72 for any reason, at least one of the laser beams will be interrupted. Conventional motor drive control circuitry responsive to an interruption in outputs from the laser receivers 4' to 5' may then operate to disable the drive of all conveyor sections 70 upstream of the section where the interruption occurred. In this way, baggage pileups with potential damage to baggage moving at high speeds, will be prevented.

Since the section 70 in which one or more of the laser beams has been interrupted can be readily identified, that particular section can be identified on a remote display to inform maintenance personnel. The personnel can then immediately gain access to the faulty conveyor section and correct the baggage pile-up by opening of the plexiglass covers 74.

Figure 7:
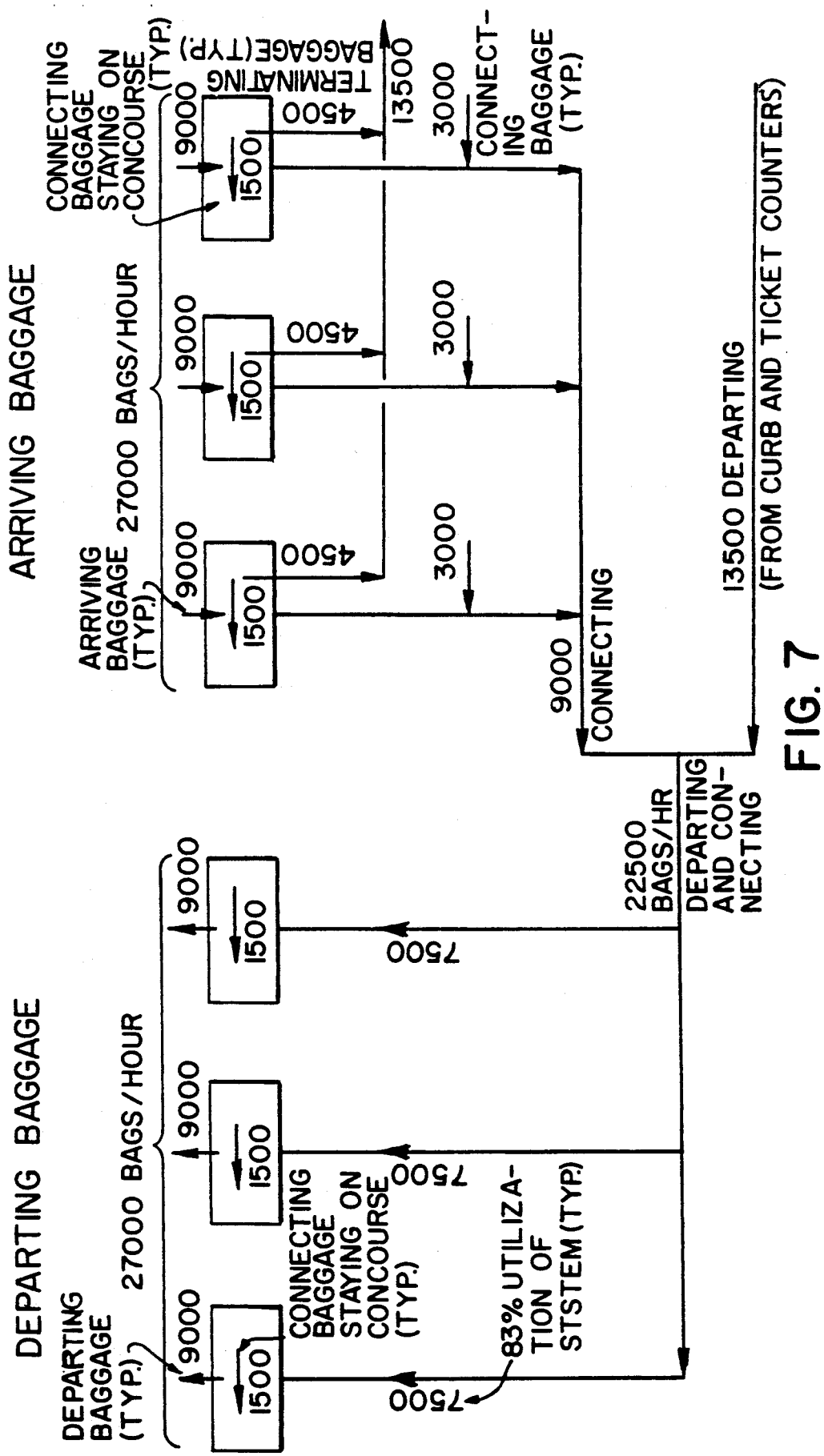
FIG. 7 is a baggage volume flow diagram showing a typical flow rate for departing, arriving and interconnecting baggage at an airport.

FIG. 7 is a baggage flow diagram depicting a typical rate of flow of baggage at the airport 10, for both departing and arriving pieces of luggage.

Assume that 45 to 55 airplanes are parked at the concourses at any given time, and they consist of a mix between wide-body and narrow-body airplanes.

Each concourse may service up to 20 planes. Each plane will be served by 6 piers 100 feet long, for a total of 120 piers per concourse. One high speed conveyor system will supply sufficient baggage to permit 10 wide-body airplanes to be loaded in one hour.

Pier sort conveyors at each of the concourses will run at 300 feet per minute. Baggage will thus accelerate from 100 feet per minute to 300 feet per minute. Baggage tags will be scanned by bar code scanners which are capable of reading bar codes on tags placed anywhere on each bag. Bags will therefore be diverted from belts running at approximately 300 feet per minute via high speed cycloidal diverters (Acco Sortrac or equivalent).

Missorts will be diverted to special piers and will be placed onto separate conveyors by baggage handlers. Following correction of the problem which caused the missort, they will then merge into the main pier sort conveyor.

A. Departing Baggage

Departing baggage is placed from curbside and ticket counters onto nine outgoing high-speed belt systems each destined to a predetermined area on one of the concourses. See FIG. 8. Having arrived at the predetermined area of the concourse, bags are diverted to specific piers corresponding to their flight numbers via the laser scanners which scan the bar code labels affixed to the bags. Bags are then loaded onto the respective airplanes.

B. Arriving Baggage

Figure 8:
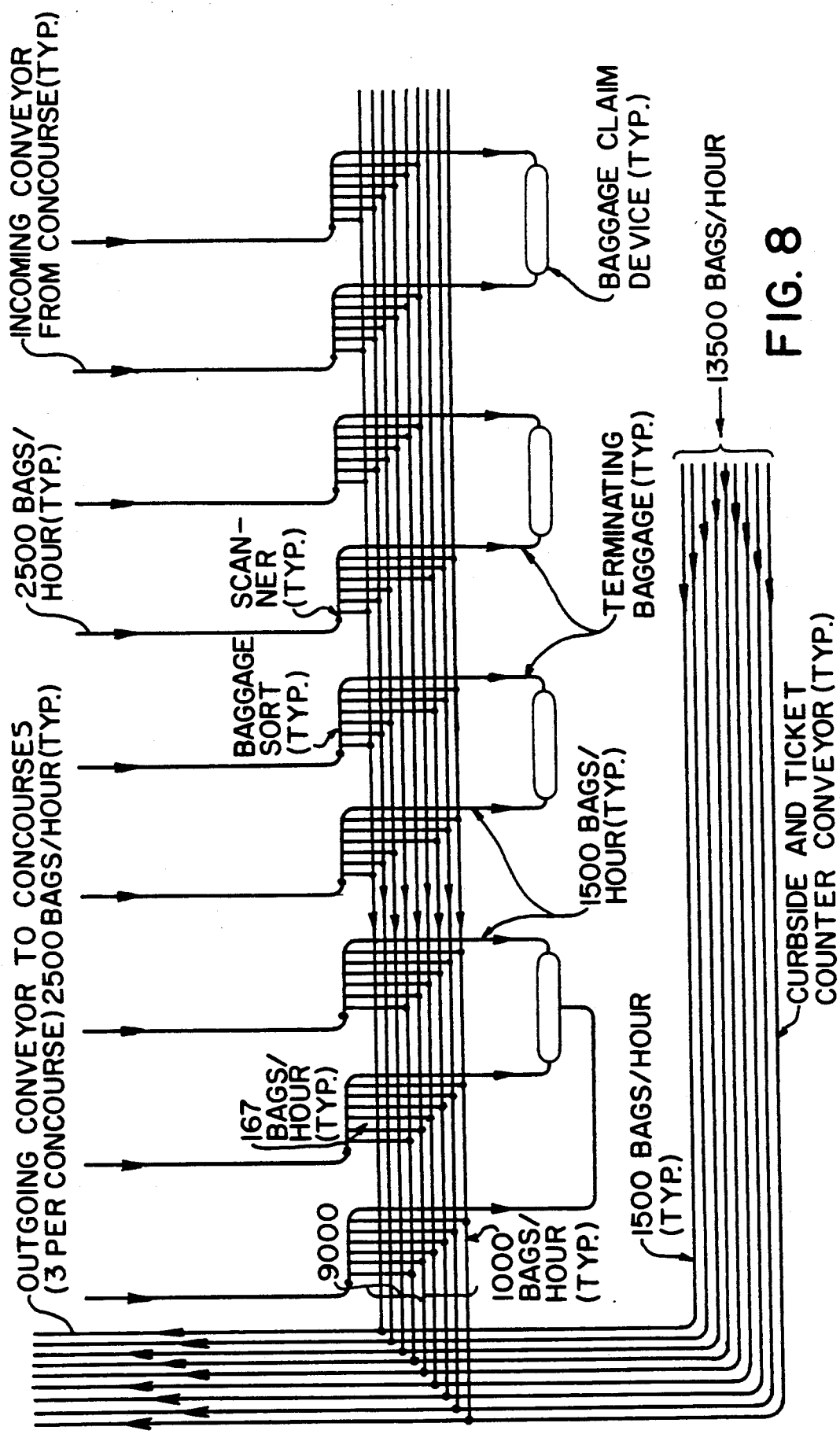
FIG. 8 is a schematic representation of baggage flow from and to a number of baggage pick-up areas at the airport terminal.

Baggage which arrives via the airplanes is unloaded and placed onto take away belts by baggage handling personnel. The exception to this is baggage which must be transported to connecting flights parked on the same concourse. Such baggage will not be placed on the take away belt but will instead be transported to its destination gates via baggage cart. The remaining arriving baggage will be transported to the terminal by the high speed conveyor systems where it will be sorted to baggage claim devices for terminating bags and to one of nine outgoing belts for merging with the nine outgoing belts described in "Departing Baggage" above, as shown in FIG. 8. The arriving baggage is then handled the same as departing baggage.

C. Baggage Volumes

Based on airplane parking projections discussed previously, calculations have been developed which indicate that a flow volume of 7500 bags per hour per concourse will suffice to meet peak volume requirements per departing baggage. See FIG. 7. 4500 bags per hour per concourse will be from passengers departing from the airport 10. 3000 bags per hour per Concourse will be from passengers arriving at the airport and proceeding to other destinations.

The above volumes are based upon the following assumed parameters.
1. Airplanes parked: 50 airplanes 50% of which are wide-bodies and 50% of which are narrow-bodies.
2. Passengers per airplane: Wide-bodies: 316; Narrow-bodies: 149.
3. Number of bags per passenger: 1.5
4. Load factor (% of all seats filled in the aircraft) 85%
5. Bags to be loaded in the peak hour of operation: 60% of all baggage which could leave in one hour.

The foregoing discussion indicates a volume of 7500 bags per hour per concourse which are transported by the present conveyor system for each concourse. The actual volume of baggage arriving at and departing from each concourse during the peak hour is calculated to be 9000 bags per hour. The difference of 1500 bags per hour per concourse is that connecting baggage which will remain on the same concourse. As mentioned, this connecting baggage will be transported between gates on the same concourse via baggage carts.

A synopsis of assumptions and calculations concerning baggage volumes follows:
6. 50% of all baggage arriving on all concourses is terminating, i.e., remains at the airport 10.
7. ⅓ of all remaining baggage is intra-concourse and is transported via baggage cart. This amounts to 1500 bags per hour per concourse.
8. The remainder of all baggage is interline baggage which will return to the terminal 12 via high speed conveyor systems to be sorted among six destinations (3 destinations for each of the remaining 2 concourses).

Further details of the pier sort arrangement at each concourse follow.

Baggage which arrives at a concourse from terminal 12 is slowed down via the decelerating belt sections to the 100 feet per minute velocity. At this speed, it is moved into a direction perpendicular to the original direction and up inclines as required into the level of the concourse. In the concourse, baggage will enter the pier sort where bar codes on the bags are scanned by laser scanners and bags are pushed off conveyors onto piers by pusher diverters. When passing pusher diverters, bags may travel at approximately 300 feet per minute. This is required to provide sufficient spacing for the bags so that the diverters will only hit one bag at a time.

Since there are three high speed conveyor systems entering each concourse, three pier sort systems are needed. One of the pier sort systems may start at a far end of the concourse. A high speed (1500 feet per minute) conveyor system may be used to transport bags from the center of each concourse approximately 2000 feet to the far end.

Important construction guidlines for the present high-speed conveyor system are as follows:

All rollers and pulleys should be dynamically balanced.

All rollers and pulleys should be mounted on precision antifriction bearings with an expected life of at least 30,000 hours (L10 life).

All side frames, supporting pulleys and bearings should be made from sturdy welded structures or castings with precision machining where required.

Conveyors should be assembled with precision equipment to prevent misalignment of rollers and pulleys.

High-speed conveyor belt section lengths should be limited to 200 feet, each with a five-horsepower drive.

High-speed conveyor belt take-up should be horizontal as described above rather than vertical, to permit stacking of the high-speed conveyor belt sections where only limited vertical clearances exist.

While the foregoing description represents a preferred embodiment of the invention, it will be obvious to those skilled in the art that various changes and modifications may be made, without departing from the true spirit and scope of the invention as pointed out in the following claims.

What is claimed is:

1. A high-speed conveyor system for rapidly conveying articles of baggage at an airport terminal facility over relatively long distances between an airport passenger terminal area and concourse areas at which arriving and departing aircraft are parked, the system comprising:

a terminal area at which outbound baggage articles and inbound baggage articles are deposited;

a number of aircraft concourse areas remote from said terminal area and at which inbound baggage articles are unloaded from and outbound baggage articles are loaded onto aircraft situated at the concourse areas;

first accelerating conveyor means in the region of the terminal area for receiving outbound baggage articles to be transported to the concourse areas, including a plurality of accelerating conveyor belt sections arranged in tandem for transporting a number of outbound baggage articles received at an upstream end of a first one of the accelerating conveyor belt sections to a downstream end of a last one of said accelerating conveyor belt sections of the first accelerating conveyor means;

first accelerating drive means for driving the accelerating conveyor belt sections of said first accelerating conveyor means at successively increasing rates of speed from the first to the last one of the accelerating conveyor belt sections;

first high-speed conveyor means for receiving outbound baggage articles from the downstream end of the last one of the accelerating conveyor belt sections of said first accelerating conveyor means, including at least one high speed conveyor belt section for transporting received outbound baggage articles at a relatively high rate of speed to a downstream end of the first high speed conveyor means;

first decelerating conveyor means in the region of the concourse areas for receiving outbound baggage articles from the downstream end of the first high speed conveyor means, including a plurality of decelerating conveyor belt sections arranged in tandem for transporting outbound baggage articles from an upstream end of a first one of the decelerating conveyor belt sections to a downstream end of a last one of the decelerating conveyor belt sections of said first decelerating conveyor means;

first decelerating drive means for driving the decelerating conveyor belt sections of said first decelerating conveyor means at successively decreasing rates of speed from the first to the last one of the decelerating conveyor belt sections;

passageways extending between said terminal area and said concourse areas, and wherein said first high-speed conveyor means are confined in said passageways;

pairs of said high-speed conveyor means are arranged parallel to one another in said passageways; and wherein each of the parallelly arranged high-speed conveyor means includes high-speed drive means for driving the associated high-speed conveyor belt sections, the drive means of the parallel high-speed conveyor means protruding sideways toward one another from the associated belt sections and being mutually staggered with respect to one another along the direction of the belt sections to permit movement of persons along service aisles between the parallel high-speed conveyor means.

2. The high-speed conveyor system of claim 1, wherein said first high-speed conveyor means includes high-speed drive means for driving said high speed conveyor belt sections at a belt rate substantially greater than a rate at which baggage articles are received at the upstream end of the first one of the accelerating conveyor belt sections of said first accelerating conveyor means.

3. The high-speed conveyor system of claim 2, wherein said high-speed drive means includes means for driving the high-speed conveyor belt sections at a belt rate between about 500 to about 1500 feet per minute.

4. The high-speed conveyor system of claim 1, wherein each high-speed conveyor belt section of said first high-speed conveyor means includes means for taking up slack in the belt section, comprising at least one idler roller, a take-up roller, and a weighted mechanical disadvantage arrangement for biasing said take-up roller in a direction substantially parallel to a belt axis of the high-speed conveyor belt section.

5. The high-speed conveyor system of claim 1, wherein each high-speed conveyor belt section of said first high-speed conveyor means includes a protective enclosure extending upwardly from long sides of the section and over the section, for confining baggage articles moving on the belt section within an interior region of the enclosure.

6. The high-speed conveyor system of claim 5, including a transparent hinged window on one side of the enclosure to permit viewing of baggage articles being moved by the high-speed conveyor belt section.

7. The high-speed conveyor system of claim 5, including light-beam interrupt baggage fault detection means arranged near the inner periphery of the protective enclosure, for detecting the presence of a baggage article approaching the inner periphery due to a baggage pile-up on the high-speed conveyor belt section.

8. The high-speed conveyor system of claim 7, including control means coupled to said fault detection system, for disabling operation of baggage conveyors upstream of the high-speed conveyor belt section on which a fault is detected.

9. A high-speed conveyor system according to claim 4, wherein the mechanical disadvantage arrangement of said belt slack taking-up means includes a biasing weight for providing a biasing force in the horizontal direction to said take-up roller.

10. A high-speed conveyor system according to claim 9, including high-speed drive means associated with each high-speed conveyor belt section, and said high-speed drive means is integrated with said belt slack taking-up means.

11. A high-speed conveyor system according to claim 10, wherein said high-speed drive means includes a motor/reducer assembly.

12. A high-speed conveyor system according to claim 11, wherein each high-speed conveyor belt section is about 200 feet in length.

13. A high-speed conveyor system according to claim 12, wherein said motor/reducer assembly comprises a motor of about a 5-HP rating.

14. A high-speed conveyor system according to claim 1, wherein said first high-speed conveyor means extends over a distance of at least 1500 feet.

15. A high-speed conveyor system according to claim 1, including:

second accelerating conveyor means in the region of at least one of the concourse areas for receiving inbound baggage articles to be transported either to the terminal area or to another one of the concourse areas, including a plurality of accelerating conveyor belt sections arranged in tandem for transporting a number of inbound baggage articles received at an upstream end of a first one of the accelerating conveyor belt sections to a downstream end of a last one of said accelerating conveyor belt sections of the second accelerating conveyor means;

second accelerating drive means for driving the accelerating conveyor belt sections of said second accelerating conveyor means at successively increasing rates of speed from the first to the last one of the accelerating conveyor belt sections;

second high-speed conveyor means for receiving inbound baggage articles from the downstream end of the last one of the accelerating conveyor belt sections of said second accelerating conveyor means, including at least one high speed conveyor belt section for transporting received inbound baggage articles at a relatively high rate of speed to a downstream end of the second high speed conveyor means;

second decelerating conveyor means in the region of the terminal area or said other one of the concourse areas, for receiving inbound baggage articles from the downstream end of the second high speed conveyor means, including a plurality of decelerating conveyor belt sections arranged in tandem for transporting inbound baggage articles from an upstream end of a first one of the decelerating conveyor belt sections to a downstream end of a last one of the decelerating conveyor belt sections of said second decelerating conveyor means; and second decelerating drive means for driving the decelerating conveyor belt sections of said second decelerating conveyor means at successively decreasing rates of speed from the first to the last one of the decelerating conveyor belt sections.

16. The high-speed conveyor system of claim 15, wherein said first and said second high-speed conveyor means include high-speed drive means for driving said high speed conveyor belt sections at a belt rate substantially greater than a rate at which baggage articles are received at the upstream end of the first one of the accelerating conveyor belt sections of said first and said second accelerating conveyor means.

17. The high-speed conveyor system of claim 16, wherein said high-speed drive means includes means for driving the high-speed conveyor belt sections at a belt rate between about 500 to about 1500 feet per minute.

18. The high-speed conveyor system of claim 15, wherein each high-speed conveyor belt section of said first and said second high-speed conveyor means includes means for taking up slack in the belt section, comprising at least one idler roller, a take-up roller, and a weighted mechanical disadvantage arrangement for biasing said take-up roller in a direction substantially parallel to a belt axis of the high-speed conveyor belt section.

19. The high-speed conveyor system of claim 15, wherein each high-speed conveyor belt section of said first and said second high-speed conveyor means includes a protective enclosure extending upwardly from long sides of the section and over the section, for confining baggage articles moving on the belt section within an interior region of the enclosure.

20. The high-speed conveyor system of claim 19, including a transparent hinged window on one side of the enclosure to permit viewing of baggage articles being moved by the high-speed conveyor belt section.

21. The high-speed conveyor system of claim 19, including sensing-beam interrupt baggage fault detection means arranged near the inner periphery of the protective enclosure, for detecting the presence of a baggage article approaching the inner periphery due to a baggage pile-up on the high-speed conveyor belt section.

22. The high-speed conveyor system of claim 21, including control means coupled to said fault detection system, for disabling operation of baggage conveyors upstream of the high-speed conveyor belt section on which a fault is detected.

23. A high-speed conveyor system according to claim 15, including passageways extending between said terminal area and said concourse areas, and wherein said first and said second high-speed conveyor means are confined in said passageways.

24. A high-speed conveyor system according to claim 23, wherein pairs of said high-speed conveyor means are arranged parallel to one another in said passageways.

25. A high-speed conveyor system according to claim 24, wherein each of the parallelly arranged high speed conveyor means include high-speed drive means for driving the associated high-speed conveyor belt sections, the drive means of the parallel high-speed conveyor means protruding sideways toward one another form the associated belt sections and being mutually staggered with respect to one another along the direction of the belt sections to permit movement of persons along service aisles between the parallel high-speed conveyor means.

26. A high-speed conveyor system according to claim 18, wherein the mechanical disadvantage arrangement of said belt slack taking-up means includes a biasing weight for providing a biasing force in the horizontal direction to said take-up roller.

27. A high-speed conveyor system according to claim 26, including high-speed drive means associated with each high-speed conveyor belt section, and said high-speed drive means is integrated with said belt slack taking-up means.

28. A high-speed conveyor system according to claim 27, wherein said high-speed drive means includes a motor/reducer assembly.

29. A high-speed conveyor system according to claim 28, wherein each high-speed conveyor belt section is about 200 feet in length.

30. A high-speed conveyor system according to claim 29, wherein said motor/reducer assembly comprises a motor of about a 5-HP rating.

31. A high-speed conveyor system according to claim 15, wherein at least one of said first and said second high-speed conveyor means extends over a distance of at least 1500 feet.

* * * * *